United States Patent
Choi et al.

(10) Patent No.: US 9,041,802 B2
(45) Date of Patent: May 26, 2015

(54) DIGITAL CAPTURE DEVICE FOR LEARNING

(75) Inventors: Myoung Soo Choi, Goyang (KR); Kwang Soo Choi, Goyang (KR)

(73) Assignee: TAMTUS CO., LTD. (KR)

( * ) Notice: Subject to any disclaimer, the term of this patent is extended or adjusted under 35 U.S.C. 154(b) by 345 days.

(21) Appl. No.: 13/386,791

(22) PCT Filed: Feb. 24, 2011

(86) PCT No.: PCT/KR2011/001279
§ 371 (c)(1),
(2), (4) Date: Jan. 24, 2012

(87) PCT Pub. No.: WO2011/105819
PCT Pub. Date: Sep. 1, 2011

(65) Prior Publication Data
US 2013/0050482 A1 Feb. 28, 2013

(30) Foreign Application Priority Data

Feb. 26, 2010 (KR) .................. 10-2010-0017683
Feb. 26, 2010 (KR) .................. 10-2010-0017684

(51) Int. Cl.
*H04N 7/18* (2006.01)
*G09B 5/04* (2006.01)
*H04N 5/225* (2006.01)
*G09B 21/00* (2006.01)

(52) U.S. Cl.
CPC .............. *G09B 5/04* (2013.01); *H04N 5/2252* (2013.01); *G09B 21/006* (2013.01)

(58) Field of Classification Search
CPC ........... H04N 5/22521; H04N 5/22522; G09B 21/006; G09B 5/04
See application file for complete search history.

(56) References Cited

U.S. PATENT DOCUMENTS

| 5,636,006 | A | 6/1997 | Wu | |
|---|---|---|---|---|
| 7,595,990 | B2 * | 9/2009 | Lee | 361/704 |
| 8,154,775 | B2 * | 4/2012 | Jeong et al. | 358/474 |
| 2007/0081338 | A1 * | 4/2007 | Kuan | 362/294 |
| 2008/0030530 | A1 * | 2/2008 | Ishida et al. | 347/3 |
| 2008/0224096 | A1 * | 9/2008 | Chang et al. | 252/301.5 |
| 2010/0157381 | A1 * | 6/2010 | Chen | 358/449 |

FOREIGN PATENT DOCUMENTS

| JP | 08-190620 | 7/1996 |
|---|---|---|
| JP | 10-051593 | 2/1998 |

(Continued)

OTHER PUBLICATIONS

International Search Report—PCT/KR2011/001279 dated Nov. 3, 2011.

*Primary Examiner* — Thai Tran
*Assistant Examiner* — Stephen Smith
(74) *Attorney, Agent, or Firm* — Cantor Colburn LLP (57) ABSTRACT

The present invention relates, in general, to a digital capture device for learning which captures (or photographs) images of both/either side of an open book in real time and transmits the captured images of the book to an output unit that enlarges or reduces the captured images (characters, pictures, etc.) of the book and displays them, thus allowing a learner to view the images, or that recognizes the characters of the images and outputs the recognized characters in the from of audio speech, thus allowing the learner to listen to the audio speech. More particularly, the present invention relates to a digital capture device for learning which is configured to exactly capture the images of the book without distorting the images.

3 Claims, 4 Drawing Sheets

(56) References Cited

FOREIGN PATENT DOCUMENTS

| JP | 2006-180296 | 7/2006 |
| KR | 10-0765371 | 10/2007 |
| KR | 10-0769107 | 10/2007 |
| WO | WO 2008066291 A1 * | 6/2008 |

* cited by examiner

DIGITAL CAPTURE DEVICE FOR LEARNING

TECHNICAL FIELD

The present invention relates, in general, to a digital capture device for learning which captures (or photographs) images of both/either side of an open book in real time and transmits the captured images of the book to an output unit that enlarges or reduces the captured images (characters, pictures, etc.) of the book and displays them, thus allowing a learner to view the images, or that recognizes the characters of the images and outputs the recognized characters in the from of audio speech, thus allowing the learner to listen to the audio speech, and, more particularly, to a digital capture device for learning which is configured to exactly capture the images of the book without distorting the images.

BACKGROUND ART

Recently, auxiliary devices for learning have been developed which are used in classrooms or lecture rooms in such a way that an auxiliary device captures images of a textbook using a camera and displays the images on a display such as a screen or the like to allow a lecturer or teacher to explain the learning material, or enlarges or reduces the captured images or recognizes characters of the images and outputs the recognized characters in the form of audio speech, thus allowing learners to see the enlarged or reduced images displayed on the display or to listen to the audio speech.

In such an auxiliary device for learning that captures images of a book (a textbook) and displays them or outputs them in the form of audio speech, it is very important to enhance the accuracy with which a digital capture device can capture the images of the book using a camera without distorting the images.

Typical conventional capture devices are classified into the following types, wherein: an open book is placed on the bottom support surface and images of the book are captured using a camera above it; and, as proposed in Korean Patent Registration No. 0765371, an open book is placed upside down on a planar glass panel and images of the book are captured using a camera located below the glass panel.

However, in the case of the type which places the open book on the bottom support surface and the images are captured from above, there is a problem of the pages being undesirably turned. Further, this type forces the user to focus the camera according to the distance between the book and the camera (if the camera has an automatic focusing function, focusing the camera takes some time) and to adjust the position of the book on the bottom support surface.

In the conventional type wherein the open book is placed on the bottom support surface and the images are captured from above or wherein the open book is placed upside down on the planar glass panel and the images are captured from below, images around the medial binding portion of the book may not be captured or may be distorted, because the binding portion of the open book is typically round.

If the images of the book captured by the camera are distorted, not only may the quality of the images of the book that are displayed on a display of an output unit suffer, but there also are many errors for an OCR (Optical Character Reader) engine of the output unit to recognize characters of the images of the book. Moreover, when a TTS (Text-To-Speech) engine converts the characters recognized by the OCR engine into an audio composition signal and outputs the signal, more errors may be produced. Also, it takes a lot of time and effort when the user edits the characters of the distorted images to output the correct audio signal.

In an effort to prevent the captured images of the book from becoming distorted, a digital capture device was proposed in Korean Patent Registration No. 0769107 which was filed by the applicant of the present invention, entitled "Electrical teaching desk with book scanner for scanning books using digital camera". This digital capture device includes a table which has a reverse 'V'-shape so that both inner pages of a book come into contact with the table, and a digital camera which captures images of the inner surface of the table below the table.

In this technique introduced by the applicant of the present invention, the reverse 'V'-shaped table prevents an image captured by the digital camera from becoming distorted. However, as shown in the specification and drawings of this patent document, a lamp which irradiates the inner surface of the table is disposed around the edge of the table. Thus, light cannot be uniformly applied to the inner surface of the table.

Therefore, although there is no distortion of the captured image, the brightness of the image may not be uniform, for example, there may be an excessively bright or dark portion or a portion of the image may be blurred. Such a case may result in the output unit erroneously recognizing the characters of the image and outputting them erroneously in the form of audio speech.

Furthermore, because an LED of the lamp is disposed above the camera, a portion of light emitted from the LED may possibly enter the lens of the camera. If this happens, the quality of the captured image deteriorates, causing an error in recognizing characters of the captured image and outputting them in the form of audio speech.

In addition, when backlight enters the casing from the outside, rather than when emitting the light from the lamp in a casing, the quality of the captured image also deteriorates. Hence, it is needed to prevent backlight from entering the casing. However, the conventional technique registered for the patent has no separate means for blocking backlight from entering the casing through the transparent table. In other words, there are many different kinds of books, and a book placed on the table may not cover the entirety of the table, causing the possibility of backlight entering the casing through the portion of the table that is not covered by the book.

Moreover, to prevent the LED, the camera, a power supply, etc. installed in the casing from malfunctioning and having a shortened life, heat generated by these components must be rapidly dissipated. However, it is difficult for the structure of the conventional technique to dissipate generated heat, because the bottom, front, rear, left and right panels of the casing are closed to prevent backlight from entering the casing.

DISCLOSURE

Technical Problem

Accordingly, the present invention has been made keeping in mind the above problems occurring in the prior art, and an object of the present invention is to provide a digital capture device for learning which is configured to prevent an image captured by a digital camera from becoming distorted and to capture the image at a uniform brightness without creating an excessive dark or bright portion or a blurred portion on the image, thus enhancing the quality of the captured image.

Another object of the present invention is to provide a digital capture device for learning in which components such as a power supply unit, etc. are installed in a separate receiving space provided in a casing, and which is configured such that heat generated in the casing can efficiently dissipate, thus preventing the components from malfunctioning or life-shortening.

A further object of the present invention is to provide a digital capture device for learning which can facilitate a user turning the pages of a book and placing it on a transparent plate.

Technical Solution

In order to accomplish the above objects, the present invention provides a digital capture device for learning, including: a transparent plate having a reverse 'V'-shape so that both inner pages of an open book come into contact with the transparent plate; a base plate disposed below the transparent plate; a digital camera mounted to a central portion of the base plate, the digital camera having a lens facing the transparent plate; a stationary mirror provided on each of left and right sides of the base plate so that images of left and right sides of the transparent plate respectively are formed on the right and left side stationary mirrors; a rotational mirror disposed above the digital camera, the rotational mirror rotating to the left or right so that an image that has formed on the left or right stationary mirror forms on the lens of the digital camera; an LED module comprising a PCB and an LED mounted to the PCB, the LED module being mounted to the base plate to irradiate the transparent plate; and a casing provided at an upper end thereof with the transparent plate, the casing containing the base plate therein.

The casing may include a center panel having a bottom surface to which the base plate is fastened, the center panel being coupled at an upper end thereof to the transparent plate, a heat dissipation panel having an 'L' shape, the heating dissipation panel being coupled to the bottom surface of the center panel, thus defining a receiving space so that a power supply unit is received in the receiving space, with a plurality of heat dissipation holes formed in the heat dissipation panel to dissipate heat generated from the power supply unit, side panels covering open opposite sides of the center panel and the heat dissipation panel, and a cover panel hinged at one end thereof to the upper end of the center panel, the cover panel openably covering the transparent plate.

Furthermore, a cover may be coupled to the base plate. The cover may allow the stationary mirrors and the rotational mirror to protrude outwards from the cover, and the digital camera and the LED module may be disposed inside the cover and are visible through the cover. The LED module may further include a diffusing filter having an arc-shaped cross-section, the diffusing filter diffusing light emitted from the LED and making an intensity of illumination of the light uniform.

Based on a vertical line passing through a junction between a first surface and a second surface of the transparent plate, an angle between the vertical line and the first surface that is disposed inside the vertical line may be greater than an angle between the vertical line and the second surface that is disposed outside the vertical line.

Advantageous Effects

A digital capture device for learning according to the present invention makes use of a reverse 'V'-shaped transparent plate, stationary mirrors and a rotational mirror and is able to capture the images of a book without distorting the images. Further, the digital capture device makes use of the installation location of an LED module, a diffusing filter and a cover panel so as to capture a high quality image that is clear and has uniform brightness.

In addition, a casing includes a center panel, a heat dissipation panel and side panels and is configured such that space that contains a camera and the LED module is isolated from the space containing a power supply unit. Thus, the present invention can prevent backlight from entering the space of the casing that contains the camera and the LED module and also allow air to easily go into and come out of the space of the casing that contains the power supply unit, thus increasing heat dissipation efficiency, thereby preventing the components from malfunctioning or having their lives shortened.

Moreover, the digital capture device can facilitate a user turning the pages of a book. As such, the present invention is very useful for the development of the related industry.

| Description of the Reference Numerals in the Drawings | |
|---|---|
| 100: digital capture device | 110: transparent plate |
| 120: base plate | 130: cover |
| 140: digital camera | 150: stationary mirror |
| 160: rotational mirror | 170: LED module |
| 180: casing | 190: power supply unit |
| 200: output unit | 204: image display |
| 205: OCR engine | 206: TTS engine |
| 209: speaker | 210: control unit |

BEST MODE

As shown in the drawings, a digital capture device 100 according to the present invention includes a transparent plate 110, a base plate 120, a digital camera 140, stationary mirrors 150, a rotational mirror 160, an LED module 170 and a casing 180.

The transparent plate 110 is made of a transparent material, such as glass, acryl, etc., allowing images of a book 1 to be seen through the material.

Further, the transparent plate 110 has a reverse 'V'-shape so that both inner pages of the open book 1 can come into close contact with the transparent plate 110.

In detail, a medial binding portion of the book 1 that has opened is disposed on the corner of the transparent plate 110, and both pages of the book 1 are placed on first and second surfaces of the transparent plate 110 that are formed on opposite sides of the corner. Therefore, all portions of the inner pages of the open book 1 that contain images, such as characters, pictures or the like, evenly spread out and come into close contact with the transparent plate 110, thus preventing the images of the book 1 captured by the camera 140 from being distorted.

Figure 3:
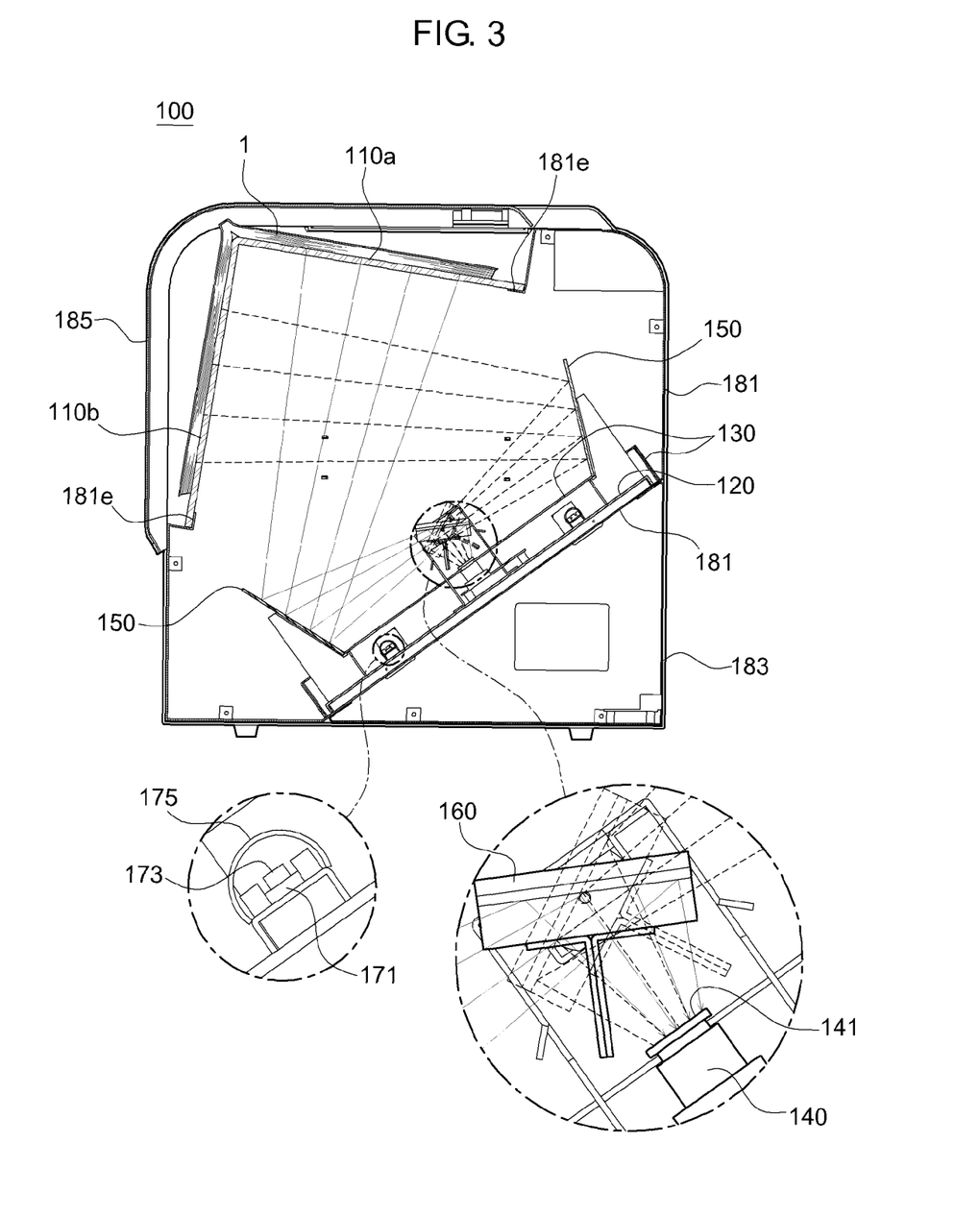
FIG. 3 is a sectional view of the digital capture device of FIG. 1, illustrating the principle of photographing a book.

Based on a vertical line passing through the junction between the first surface 110a and the second surface 110b of the transparent plate 110, an angle between the vertical line and the first surface 110a that is disposed inside is greater than an angle between the vertical line and the second surface 110b that is disposed outside.

Such a configuration of the transparent plate 110 makes it possible for the open book 1 to be consistently placed on the transparent plate 110 and facilitates a user turning the pages of the book.

Although there is a difference in weight between both sides of the open book 1, the book 1 can be prevented from slipping towards the heavier side. In other words, the open book 1 can be stably placed on the transparent plate 110. Further, to turn the pages of the book, the user can hold only a first side of the book 1 and lightly lift it while the other second side of the book 1 is in contact with the transparent plate 110, after which the pages of the first side of the book 1 can be turned. Hence, turning the pages of the book can be facilitated.

It is preferable for the transparent plate 110 to be configured such that the first surface 110a is angled to the vertical line at an angle from 55° to 75° and the second surface 110b is offset relative to the vertical line by an angle from 15° to 35°.

The base plate 120 is disposed in the casing 180 and directly faces the transparent plate 110. The digital camera 140, the rotational mirror 160, the stationary mirrors 150, the LED module 170, etc. are mounted to the base plate 120.

The digital camera 140, the rotational mirror 160, the stationary mirrors 150, the LED module 170, etc. may be directly installed on the bottom surface of the casing 180 without making use of the base plate 120. However, in this case, it is neither easy to mount these components to the bottom surface of the casing 180 nor easy to precisely adjust the positions at which they are arranged after installation.

Therefore, mounting these components to the base plate 120 outside the casing 180, precisely adjusting their arrangement positions, and then installing the base plate 120 on the bottom surface of the casing 180 can make it easier to install these components in the casing 180.

Figure 2:
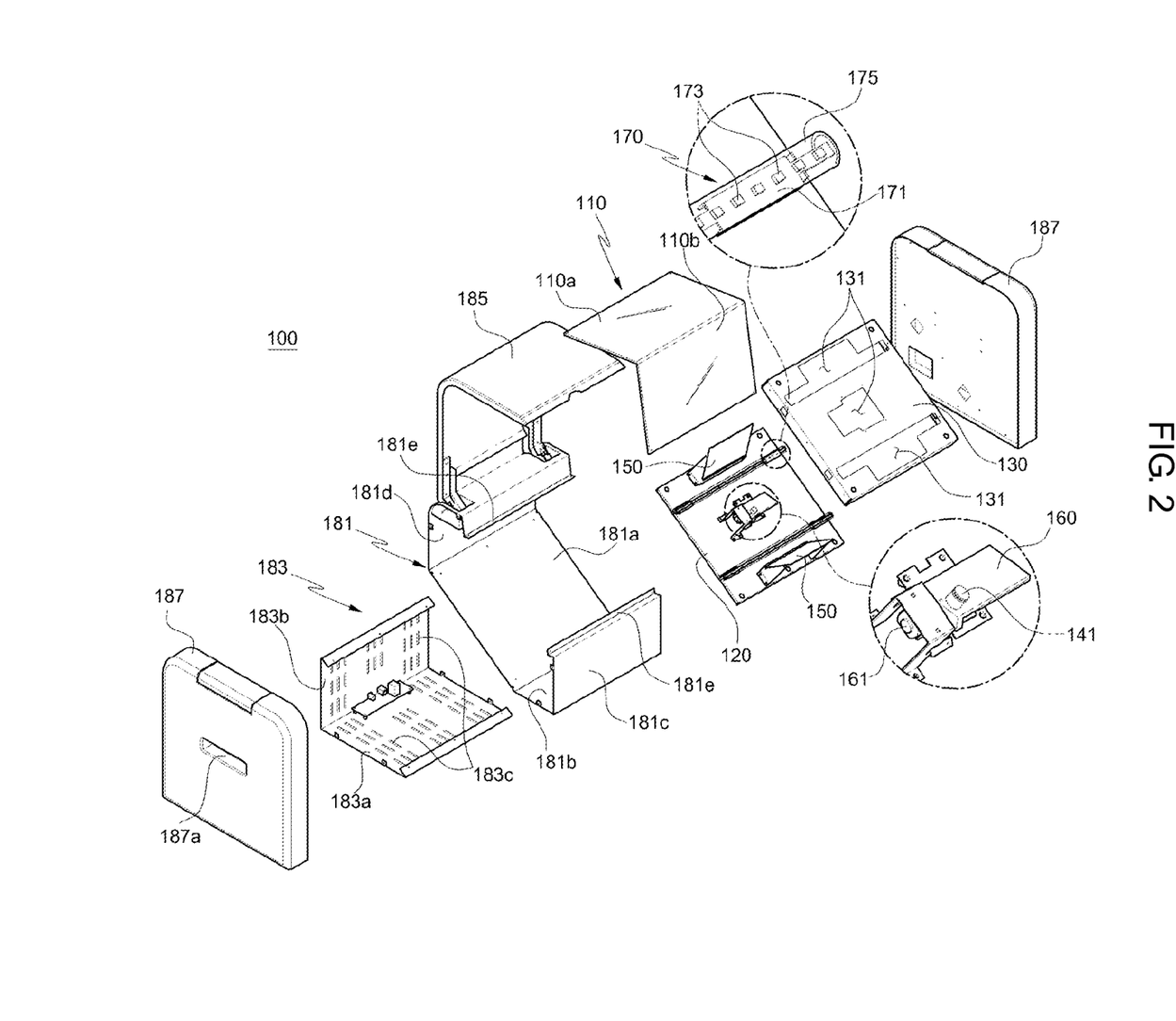
FIG. 2 is an exploded perspective view of the digital capture device of FIG. 1.

A cover 130 is coupled to the base plate 120. The cover 130 allows the stationary mirrors 150 and the rotational mirror 160 to protrude outwards from the cover 130. Further, the digital camera 140 and the LED module 170 are disposed inside the cover 130 but are visible through the cover 130. A plurality of open holes 131 are formed in the cover 130 so that the camera 140, the rotational mirror 160, the stationary mirrors 150, the LED module 170, etc. are exposed through the open holes 131.

The cover 130 contains therein the digital camera 140 and the LED module 170 that are comparatively expensive, thus protecting these components from external shocks or the like. Also, among light emitted from LEDs 173, the cover 130 interrupts light going towards the digital camera 140, thus minimizing light of the LEDs 173 from entering a lens 141. More preferably, although it is not shown in the drawings, a partition may be disposed on the cover 130 between the LED module 170 and the digital camera 140, thus more reliably preventing light emitted from the LEDs 173 from entering the lens 141.

The stationary mirrors 150 are respectively provided on the left and right sides of the base plate 120. Images of the first and second surfaces of the transparent plate 110 which face the stationary mirrors 150 in diagonal directions respectively form on the right and left side stationary mirrors 150. In other words, an image of the right second surface of the transparent plate 110 forms on the left stationary mirror 150. An image of the left first surface of the transparent plate 110 is formed on the right stationary mirror 150.

The rotational mirror 160 is disposed just above the lens of the digital camera 140. A motor 161 rotates the rotational mirror 160 to the left or the right so that the rotational mirror 160 reflects an image that forms on the left or right stationary mirror 150 onto the lens 141, thus forming the image on the lens 141.

The user can use a controller (not shown) which is provided on an outer surface of the casing 180 so as to control the motor 161 that rotates the rotational mirror 160 to the left or the right. For example, the user may rotate the motor 161 to the left or the right to capture an image of only one side of the open book 1. Alternatively, the user may alternately rotate the motor 1 between the left and the right to successively capture images of the first and second sides of the open book 1.

The controller may be set by the user such that after the book 1 has been placed on the transparent plate 110 and a predetermined time period (for example, three seconds) has passed after detection of the placement of the book 1, an image of the left or right side of the book 1 is captured or images of the left and right sides of the book 1 are successively captured, automatically. Furthermore, the controller senses the intensity of illumination in the casing 180 so that if the intensity of illumination is lower than a predetermined degree, the controller interrupts capturing an image and notifies the user of this using a flasher or beep sound. Moreover, the controller controls the overall operation of the digital capture device 100, for example, turning a power supply unit 190 on/off, transmitting an image captured by the digital camera 140 to an output unit, and so on.

The digital camera 140 is mounted to a central portion of the base plate 120 and oriented such that the lens 141 faces the transparent plate 110. The rotational mirror 160 is disposed just above the lens 141 at a predetermined distance.

The technology of the digital camera 140 is well known, therefore a further detailed explanation thereof will be omitted.

The LED module 170 is provided on the base plate 120 between the digital camera 140 and the stationary mirror 150. The LED module 170 includes a PCB 171, the LEDs 173 which are mounted on the PCB 171, and a diffusing filter 175 which covers the LEDs 173 so that light emitted from the LEDs 173 can irradiate the diffusing filter 175 at a uniform intensity of illumination.

The diffusing filter 175 has an arc-shaped cross-section and covers the surfaces of the LEDs 173, thus diffusing light of the LEDs 173 that has a high degree of straightness and emitting the light at a uniform intensity of illumination.

The general shape of the casing 180 is that of a cuboid. The casing 180 includes a center panel 181, a heat dissipation panel 183, side panels 187 and a cover panel 185.

The center panel 181 includes the bottom surface 181a which is inclined to the ground at a predetermined angle based on the drawings, a lower surface 181b which is connected to the bottom surface 181a and is parallel to the ground, and front and rear surfaces 181c and 181d which are connected to the bottom surface and the lower surface and are perpendicular to the ground. The base plate 120 is fastened to the bottom surface 181a. The center panel 181 further includes a support 181e which is disposed at an upper position facing the bottom surface 181a so that the transparent plate 110 is placed on and supported by the support 181e. A portion of the center panel 181 on which the transparent plate 110 is disposed is open. Both sides of the center panel 181 to which the side panels 187 are coupled are also open.

The heat dissipation panel 183 includes a horizontal surface 183a which is horizontal with respect to the ground, and a vertical surface 183b which is vertical with respect to the ground. The heat dissipation panel 183 is coupled to the bottom surface 181a of the center panel 181, thus forming a receiving space.

The receiving space defined by the heat dissipation panel 183 contains components such as the power supply unit 190 that are not directly related to capturing an image.

A plurality of heat dissipation holes 183c for outside air circulation are formed in the heat dissipation panel 183. Both heat generated from the components, including the power supply unit 190, that contain in the receiving space of the heat dissipation panel 183 and heat transferred from the digital camera 140 and the LEDs 173 through the bottom surface 181a of the center panel 181 can be dissipated to the outside by the heat dissipation holes 183c. This structure can thus prevent heat from causing the power supply unit 190, the digital camera 140 or the LED module 170 to malfunction or from reducing the lifetime thereof as a result of, for example, being damaged by a fire.

The side panels 187 cover the open opposite sides of the center panel 181 and the heat dissipation panel 183. A grip recess 187a is formed in each side panel 187 to allow the user to easily hold the casing 180 and move it.

One end of the cover panel 185 is rotatably hinged to the upper end of the center panel 181 so that the cover panel 185 opens or closes the transparent plate 110.

Figure 1:
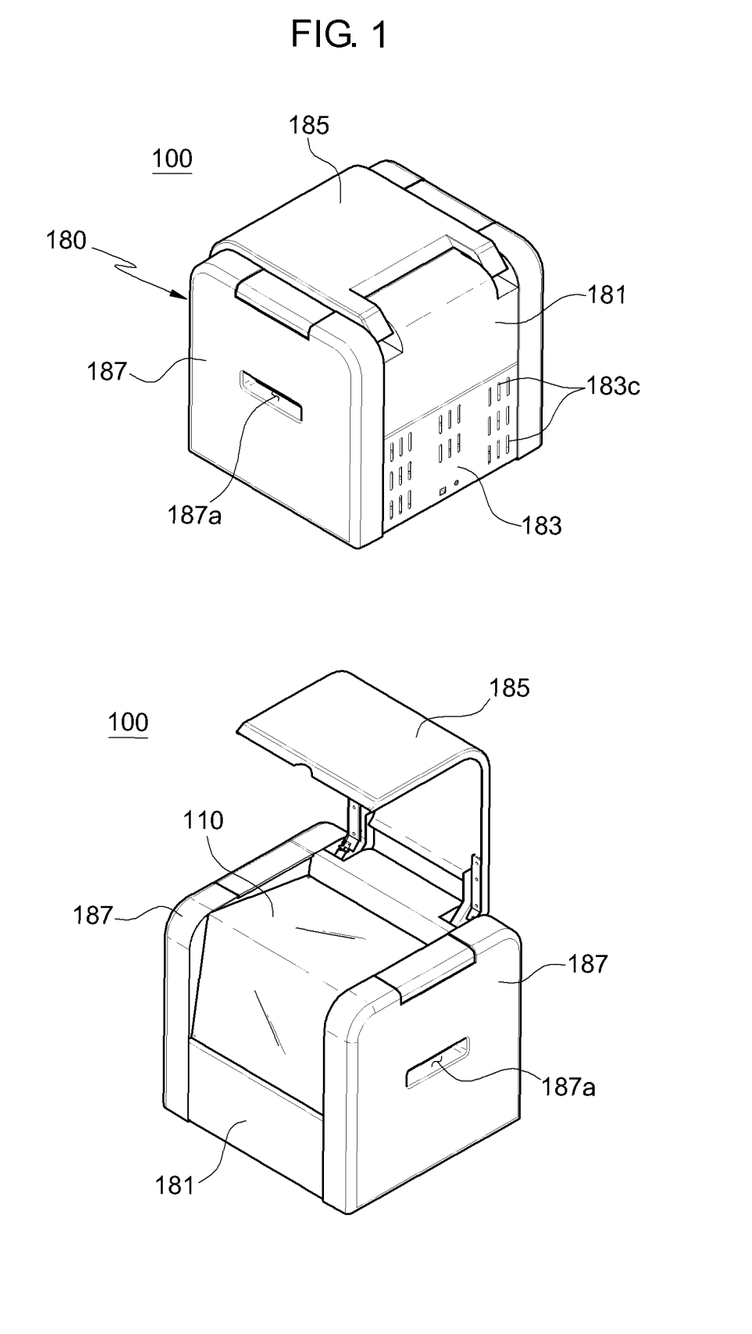
FIG. 1 is of perspective views showing a digital capture device according to the present invention.

The cover panel 185 covers the transparent plate 110 and protects it when the digital capture device 100 is not in use. Further, when the digital capture device 100 is in use, if the book 1 cannot cover the entirety of the transparent plate 110 and there is a probability of backlight entering the casing 180 through the transparent plate 110, the cover panel 185 may cover the transparent plate 110 on which the open book 1 is placed, thus preventing the backlight from entering the casing 180.

In the digital capture device 100 according to the present invention having the above-mentioned construction, an image captured from a book is transmitted to the output unit 200 by wired or wireless means and is displayed on a screen along with audio as necessary.

A computer installed with different kinds of necessary programs may be used as the output unit 200.

Figure 4:
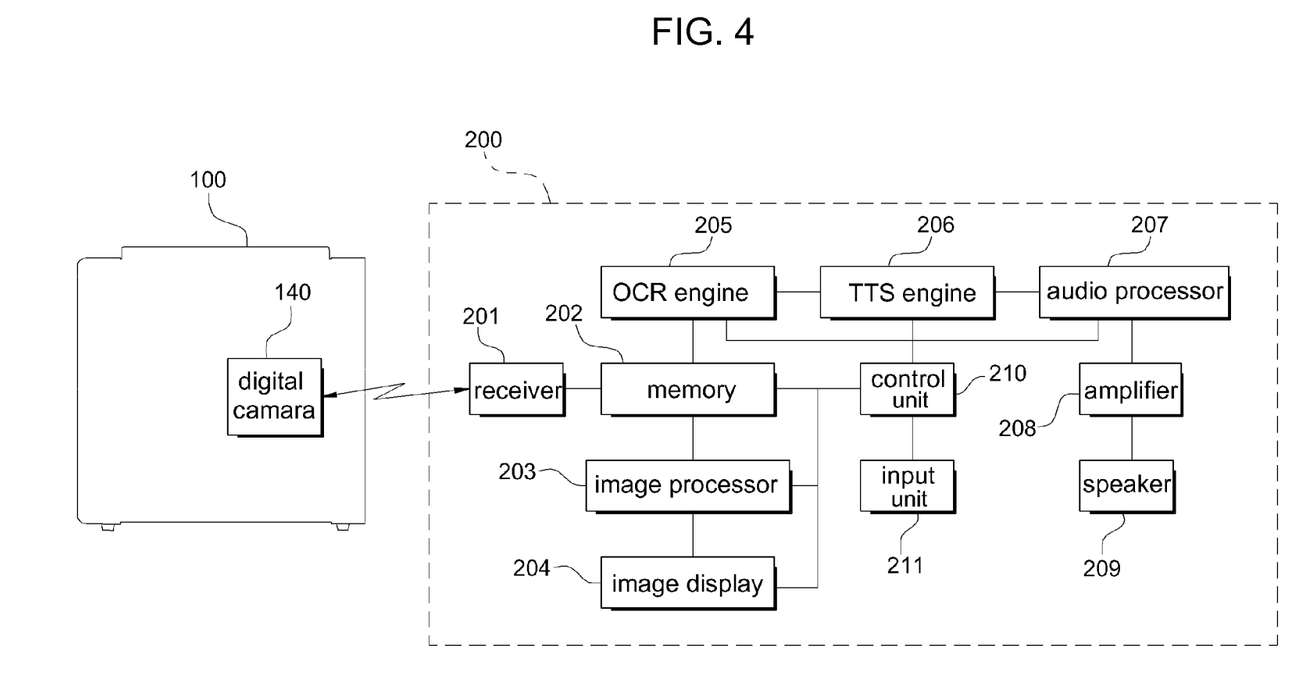
FIG. 4 is a block diagram schematically showing the construction of an output unit that enlarges or reduces an image captured by the digital capture device and displays it and that recognizes characters of the captured images and outputs the characters in the form of audible speech.

Hereinafter, the output unit will be briefly explained with reference to FIG. 4.

In the output unit 200, a receiver 201 receives an image captured by the digital capture device 100.

A memory 202 stores the image the receiver 201 has received.

An image display 204 displays the image stored in the memory 202 and shows the image to learners.

An image processor 203 processes the image displayed on the image display 204 (for example, enlarges or reduces the image or controls the brightness, color tone, viewing angle, etc. of the image), thus allowing the learners to easily see the image.

An OCR (Optical Character Reader) engine 205 recognizes characters of the image stored in the memory 202.

A TTS (Text-To-Speech) engine 206 converts character data recognized in the OCR engine 205 into audio data and composes the audio data.

An audio processor 207 processes the audio data converted and composed by the TTS engine 206, thus creating an output-available audio signal.

An amplifier 208 amplifies the audio signal of the audio processor.

A speaker 209 outputs the audio signal of the amplifier in the form of audio.

An input unit 211 receives a variety of command signals from the user.

A control unit 210 controls the general operation of the output unit 200.

The output unit 200 having the above-mentioned construction receives in real time an image of the book captured by the digital camera, enlarges or reduces the received image (characters, pictures, etc.) of the book and displays the image, and recognizes the characters of the image of the book and outputs these in the form of audio speech, enabling the user to listen to them. Therefore, the present invention can be very helpful and useful not only to normal learners but also, particularly, to learners who are blind, or who are learning or who are reading books.

Although the digital capture device according to the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A digital capture device for learning, comprising:
a transparent plate having a reverse 'V'-shape so that both inner pages of an open book come into contact with the transparent plate;
a base plate disposed below the transparent plate;
a digital camera mounted to a central portion of the base plate, the digital camera having a lens facing the transparent plate;
a stationary mirror provided on each of left and right sides of the base plate so that images of left and right sides of the transparent plate respectively are formed on the right and left side stationary mirrors;
a rotational mirror disposed above the digital camera, the rotational mirror rotating to the left or right so that an image that has formed on the left or right stationary mirror forms on the lens of the digital camera;
an LED module comprising a PCB and an LED mounted to the PCB, the LED module being mounted to the base plate to irradiate the transparent plate; and
a casing provided at an upper end thereof with the transparent plate, the casing containing the base plate therein, wherein the casing comprises:
a center panel having a bottom surface to which the base plate is fastened, the center panel being coupled at an upper end thereof to the transparent plate;
a heat dissipation panel having an 'L' shape, the heating dissipation panel being coupled to the bottom surface of the center panel, thus defining a receiving space so that a power supply unit is received in the receiving space, with a plurality of heat dissipation holes formed in the heat dissipation panel to dissipate heat generated from the power supply unit;
side panels covering open opposite sides of the center panel and the heat dissipation panel; and
a cover panel hinged at one end thereof to the upper end of the center panel, the cover panel openably covering the transparent plate.

2. The digital capture device for learning according to claim 1, wherein a cover is coupled to the base plate, the cover allowing the stationary mirrors and the rotational mirror to protrude outwards from the cover while the digital camera and the LED module are disposed inside the cover and are visible through the cover, and the LED module further comprises a diffusing filter having an arc-shaped cross-section, the diffusing filter diffusing light emitted from the LED and making an intensity of illumination of the light uniform.

3. The digital capture device for learning according to claim 2, wherein based on a vertical line passing through a junction between a first surface and a second surface of the transparent plate, an angle between the vertical line and the first surface that is disposed inside the vertical line is greater than an angle between the vertical line and the second surface that is disposed outside the vertical line.

* * * * *